Figures 1, 2:
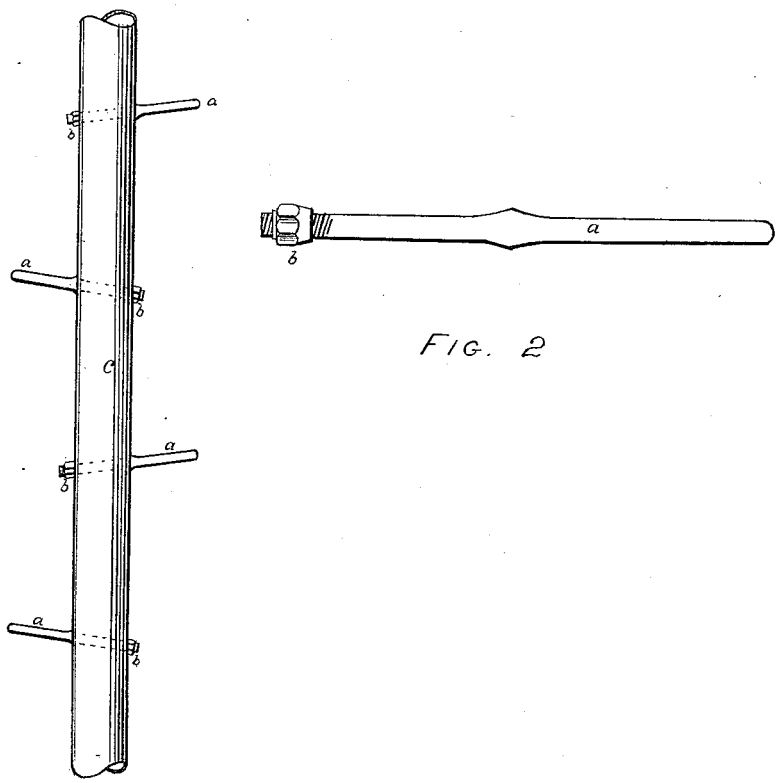

(No Model.)

A. T. HYDE.
LADDER.

No. 338,528. Patented Mar. 23, 1886.

WITNESSES
H. B. Applewhait
Daniel Clark

INVENTOR
Alfred T. Hyde

UNITED STATES PATENT OFFICE.

ALFRED T. HYDE, OF OIL CITY, PENNSYLVANIA.

LADDER.

SPECIFICATION forming part of Letters Patent No. 338,528, dated March 23, 1886.

Application filed November 21, 1885. Serial No. 183,535. (No model.)

*To all whom it may concern:*

Be it known that I, ALFRED T. HYDE, a citizen of the United States, residing at Oil City, in the county of Venango and State of Pennsylvania, have invented certain new and useful Improvements in Ladders, of which the following is a full, clear, and exact description, reference being had to the accompanying drawings, in which—
Figure 1 represents a portion of a ladder embodying my improvements. Fig. 2 is a detail of one of the rungs detached.

My invention relates to ladders; and the same consists, essentially, in a tubular post having a series of removable rungs projecting alternately from two sides of the post, as I shall hereinafter describe and claim.

The object of my invention is to form a cheap, strong, and durable ladder, the rungs of which may be easily removed and replaced in structures having hollow closed posts.

To enable others skilled in the art to make and use my invention, I will now proceed to describe the exact manner in which I have carried it out.

In the said drawings, C is a hollow post having a series of holes made in two of its sides, the holes of one series being slightly below the horizontal plane of the other series. The rungs $a$ are inserted in these holes and are arranged at a slight upward inclination, as shown in Fig. 1.

By reference to Fig. 2, it will be observed the rungs have one of their ends threaded, and are also provided with enlarged portions or shoulders at or near the center, these enlarged portions being of a diameter slightly larger than the diameter of the holes formed in the side of the post, so that said rungs will not pass entirely through the holes, but will be tightly drawn into them by means of the nuts $b$, engaging the opposite and threaded ends of the rungs. This manner of securing the rungs makes an absolutely water-tight joint, while the rungs are firmly secured.

The nuts $b$ may be made tapering, to form a tight joint at the opposite or lower end of the rung, as well as locking itself at the same time.

I am aware it is not broadly new to construct a pole-ladder with rungs inclined toward the sides of the pole and with a pivoted base-piece. I am also aware that fire-escape ladders have been constructed of tubular iron; and these features I therefore do not broadly claim as my invention.

Having thus described my invention, what I claim as new, and desire to secure by Letters Patent, is—

1. An improved ladder having a single sustaining-post, and provided with holes having inclined edges and arranged upon opposite sides of the post, in combination with a series of oppositely-disposed rungs extending through each alternate pair of holes, and provided with a shoulder or enlargement to enter one of said holes and form a tight joint therewith, substantially as described.

2. The combination, with the post C, having the alternately-disposed holes upon either side, of the obliquely-extending rungs $a$, located alternately upon opposite sides of the post, said rungs having each an enlargement or shoulder formed thereon to enter the post, and a nut, $b$, to secure said rung, substantially as set forth.

3. In a ladder, the post C, provided with a series of holes on two of its sides, in combination with the inclined rungs $a$, provided with enlargements at or near their centers, and the nuts $b$, for engaging the opposite and threaded ends of the rungs, substantially as shown and described.

ALFRED T. HYDE.

Witnesses:
R. G. RUSSELL,
D. B. STOLL.